(12) United States Patent
Kuo

(10) Patent No.: US 8,062,456 B2
(45) Date of Patent: Nov. 22, 2011

(54) METHOD FOR PRODUCING A BUFFER PAD

(76) Inventor: Chun-Fu Kuo, Taichung Hsien (TW)

( * ) Notice: Subject to any disclaimer, the term of this patent is extended or adjusted under 35 U.S.C. 154(b) by 272 days.

(21) Appl. No.: 12/501,404

(22) Filed: Jul. 10, 2009

(65) Prior Publication Data

US 2011/0005668 A1    Jan. 13, 2011

(51) Int. Cl.
*B29C 65/48* (2006.01)
*B29C 65/52* (2006.01)
*B32B 37/12* (2006.01)
*B32B 37/20* (2006.01)
*B32B 38/10* (2006.01)
*B32B 43/00* (2006.01)

(52) U.S. Cl. .................. 156/247; 156/249; 156/250

(58) Field of Classification Search .............. 156/247, 156/249, 250, 293
See application file for complete search history.

(56) References Cited

U.S. PATENT DOCUMENTS

| 3,020,186 | A | * | 2/1962 | Lawrence | 156/248 |
| 4,360,015 | A | * | 11/1982 | Mayer | 602/47 |
| 2001/0045147 | A1 | * | 11/2001 | Schultes | 83/13 |
| 2010/0193117 | A1 | * | 8/2010 | Kim | 156/247 |

\* cited by examiner

*Primary Examiner* — Sing P Chan

(57) ABSTRACT

A method for producing a buffer pad is provided with the following steps: cutting a plate into a mesh and a plurality of blocks; the mesh has a plurality of mesh holes, and the blocks have a shape corresponding to the mesh holes and are engaged with the mesh holes respectively; releasably attaching the cut plate to a sticky surface of a substrate, thereby the first surface of the block are temporarily attached to the substrate; separating the mesh from the substrate, and the blocks disengaging from the mesh holes and being left on the substrate; coating the second surfaces of the blocks with adhesive; attaching a film to the second surfaces of the blocks; separating the blocks from the sticky surface of the substrate. Thereby, a buffer pad is produced.

4 Claims, 7 Drawing Sheets

METHOD FOR PRODUCING A BUFFER PAD

BACKGROUND OF THE INVENTION

1. Field of the Invention

The present invention relates to a method for producing a buffer pad, and more particularly to a method for attaching multiple blocks to a film quickly and tidily.

2. Description of the Prior Art

A conventional buffer pad has a film with multiple blocks disposed thereon. Because the blocks are separately arranged on the film, they have to be attached on the film one by one, which is done by hand. However, this method costs lots of manpower and time, which is contrary to mass production. Besides, the blocks are not precisely arranged since this method is done by hand.

SUMMARY OF THE INVENTION

The main object of the present invention is to provide a method to quickly and precisely attach multiple blocks to a film.

To achieve the above object, a method is provided with the following steps:

cutting a plate into a mesh and a plurality of blocks; the mesh has a plurality of mesh holes, and the blocks have a shape corresponding to the mesh holes and are engaged with the mesh holes respectively;

releasably attaching the cut plate to a sticky surface of a substrate, thereby the first surface of the block are temporarily attached to the substrate;

separating the mesh from the substrate, and the blocks disengaging from the mesh holes and being left on the substrate;

coating the second surfaces of the blocks with adhesive;

attaching a film to the second surfaces of the blocks;

separating the blocks from the sticky surface of the substrate.

Thereby, a buffer pad is produced. This method helps realize the object of mass production as well as automated production with lower cost. Also, the quality of the product is elevated at the same time.

The present invention will become more obvious from the following description when taken in connection with the accompanying drawings, which show, for purpose of illustrations only, the preferred embodiments in accordance with the present invention.

BRIEF DESCRIPTION OF THE DRAWINGS

FIG. 1A is a drawing showing a part of a cut plate;

FIG. 1B is a drawing showing a part of a mesh;

FIG. 1C is a drawing showing a part of a substrate being attached with blocks;

FIG. 1D is a drawing showing a part of a substrate and a film sandwiching blocks;

FIG. 1E is a drawing showing a part of a film attached with blocks;

DETAILED DESCRIPTION OF THE PREFERRED EMBODIMENTS

Figure 1:
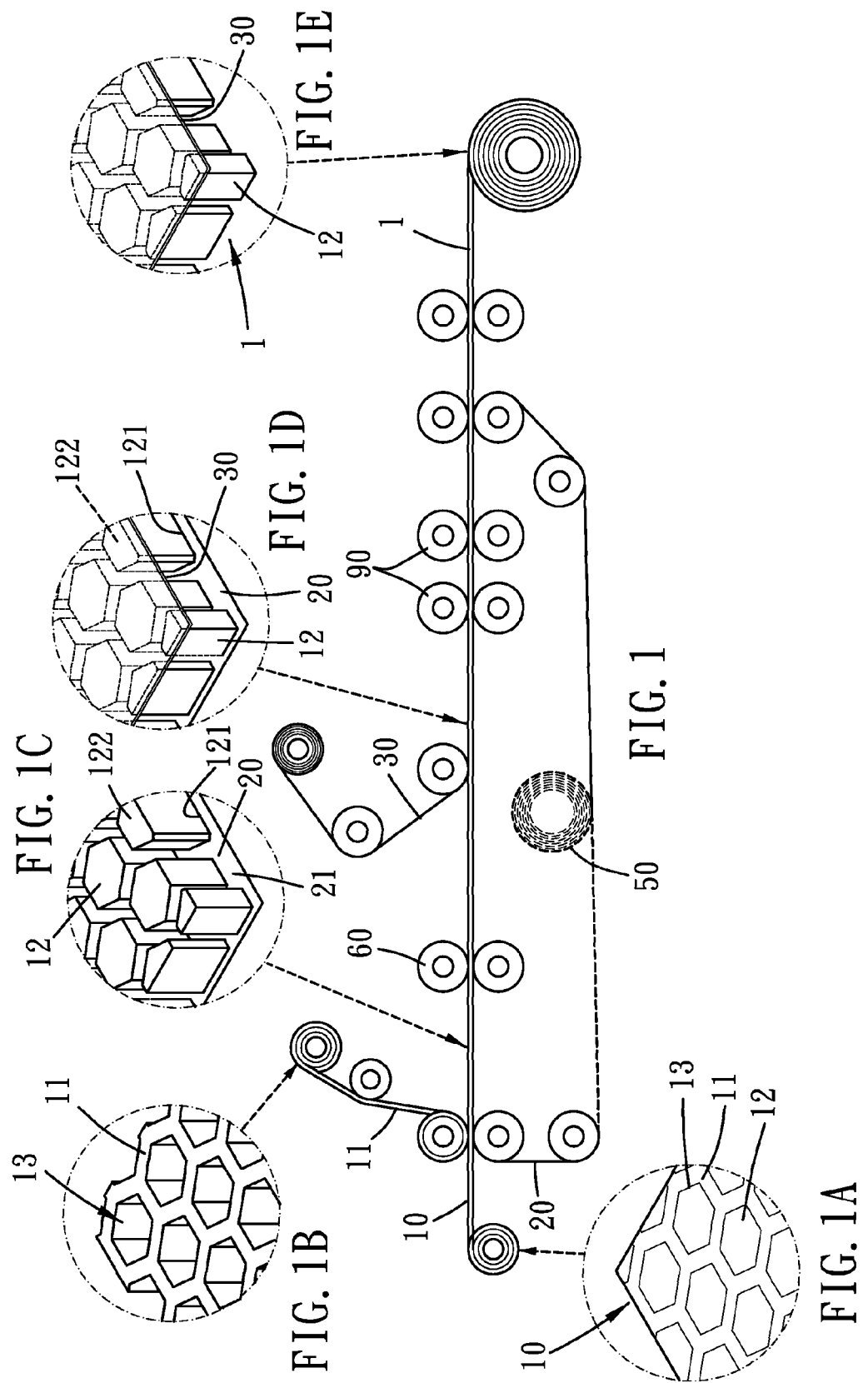
FIG. 1 is a drawing showing a process utilizing the method of the present invention.

Please refer to FIG. 1. A method for producing a buffer pad of the present invention includes several steps.

Figure 2:
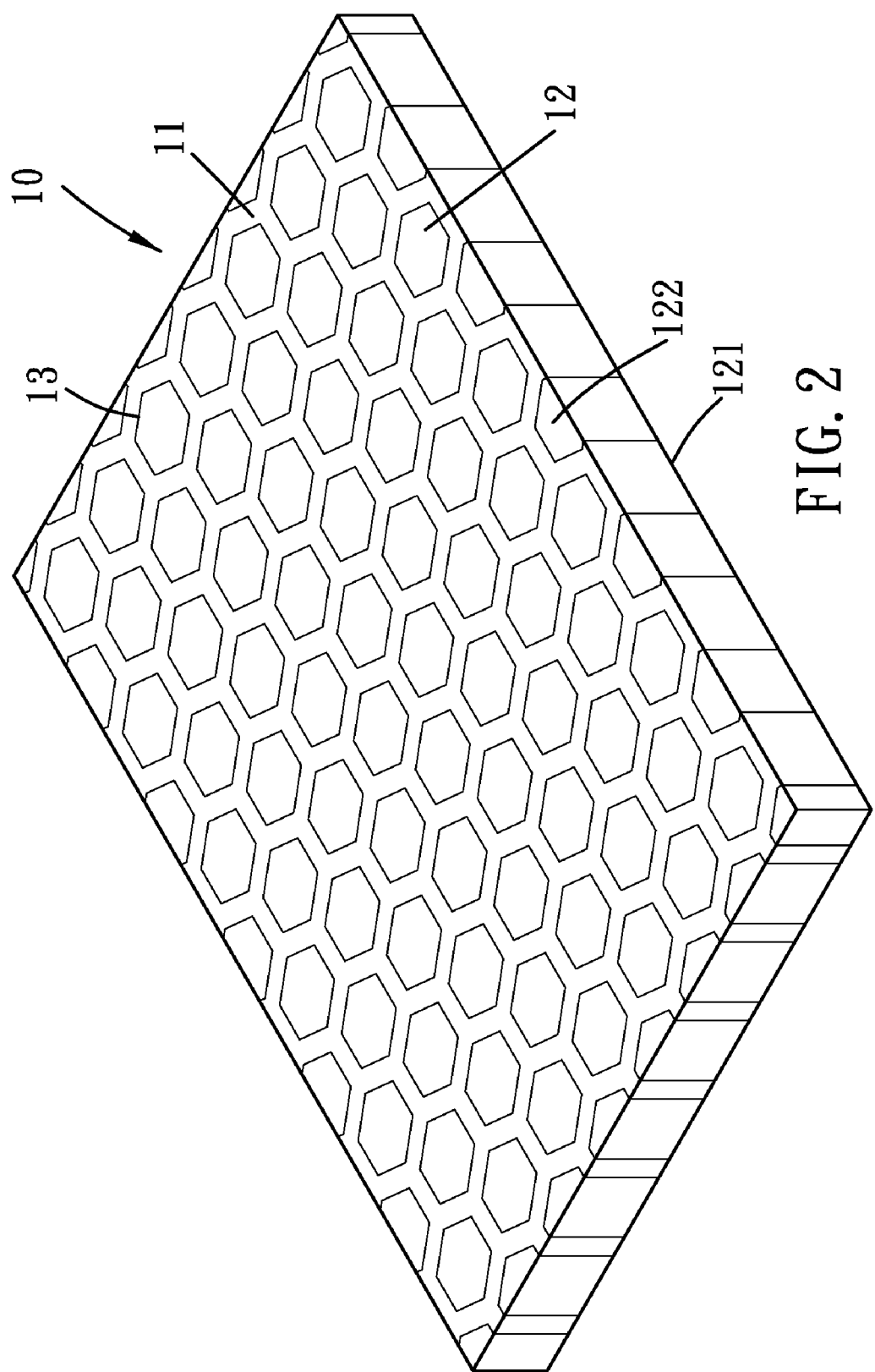
FIG. 2 is a drawing showing a plate after being cut.

In the first step, we prepare a flexible and resilient plate 10, namely the plate 10 can deform while pressed by an external force and return to its original shape as the external force is gone. The plate 10 can be made of a foam material, a plastic material, a rubber material or the like. The plate 10 is cut to form a mesh 11 and a plurality of blocks 12 as can be seen in FIG. 1A and FIG. 2. The mesh 11 has a plurality of mesh holes 13, and the blocks 12 have a shape corresponding to the mesh holes 13 and are engaged with the mesh holes respectively. More specifically, the plate 10 simply undergoes one cutting procedure to form the mesh 11 and the blocks 12 simultaneously, and the plate 10 only has notches without separating the mesh 11 and the blocks 12 during the cutting procedure. Each block 12 has a first surface 121 and a second surface 122 opposite to the first surface 121.

Figure 3:
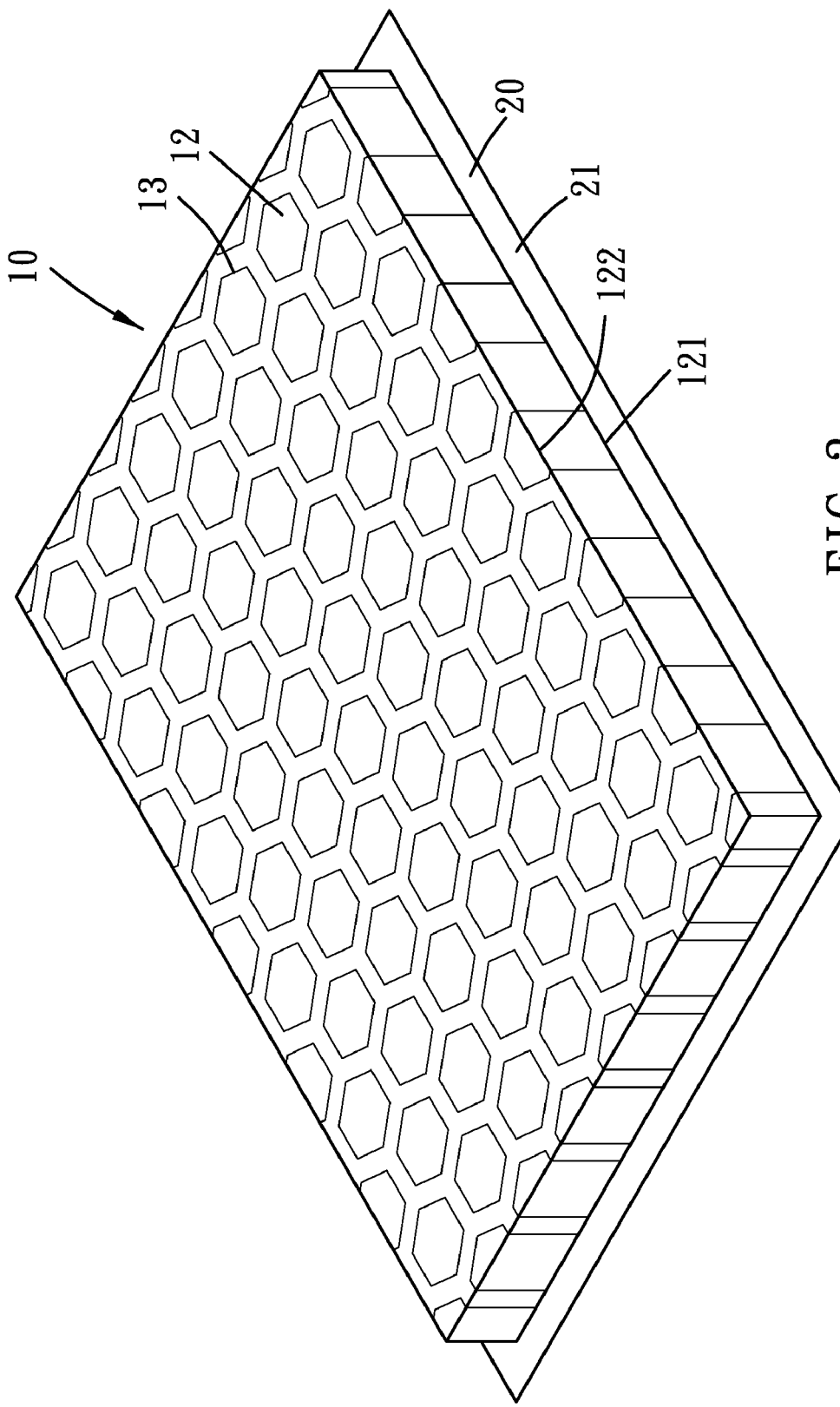
FIG. 3 is a drawing showing a plate attaching to a substrate.

Please further refer to FIG. 3. In the second step, we releasably attach the cut plate 10 to a sticky surface 21 of a substrate 20, thereby the first surfaces 121 of the blocks 12 are temporarily attached on the substrate 20. The substrate 20 is preferred to be flexible in order to be stowed, and one example thereof is kraft paper.

Figure 4:
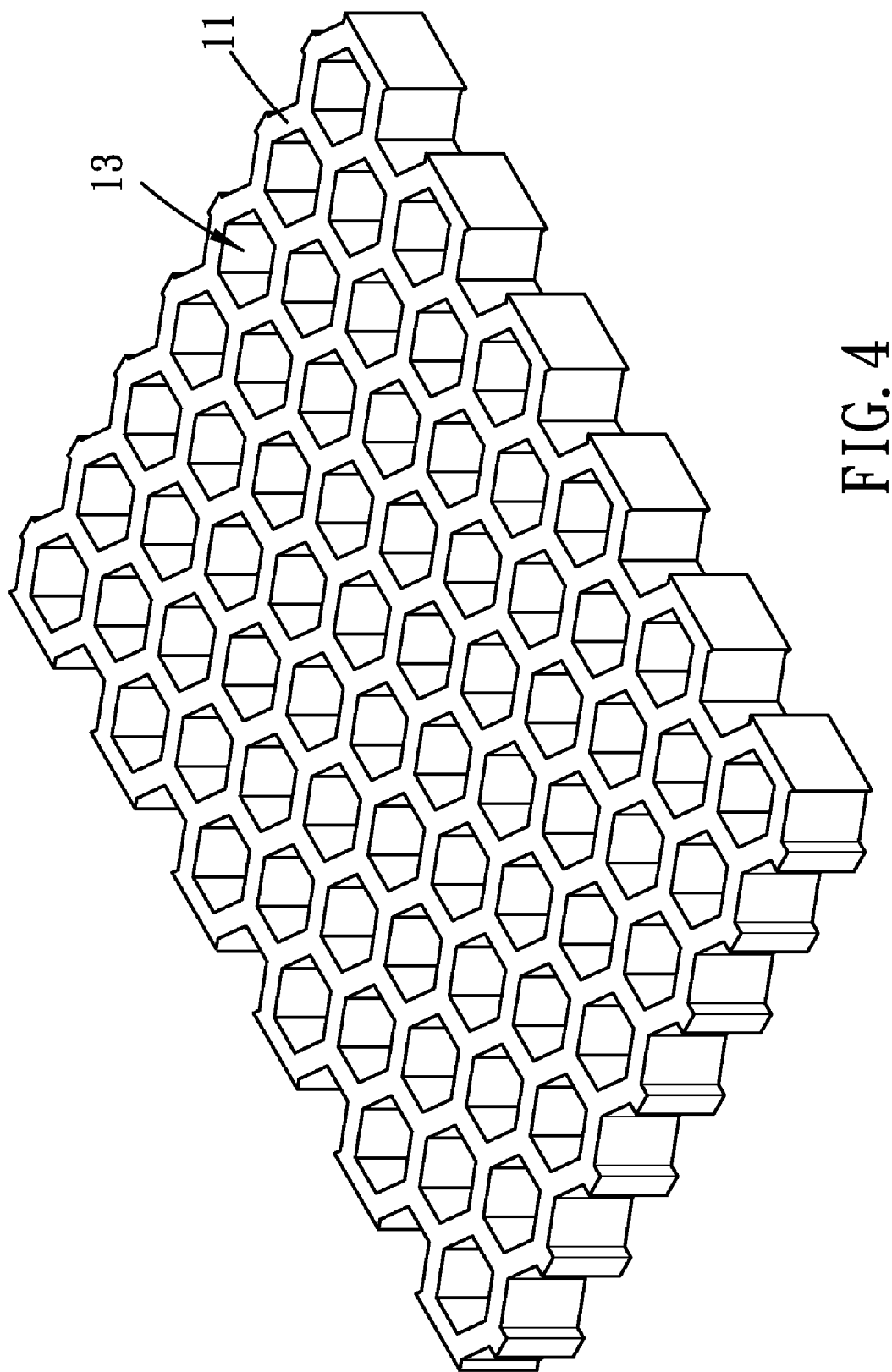
FIG. 4 is a drawing showing a mesh.

As shown in FIG. 1B and FIG. 4, the mesh 11 is then separated from the substrate 20 in the third step of the method. Therefore, the blocks 12 disengage from the mesh holes 13 and are left on the substrate 20, as shown in FIG. 1C. As such, the blocks 12 can be precisely arranged on the substrate 20.

In the fourth step, the second surfaces 122 of the blocks 12 are coated with adhesive by the coating roller 60. In the next step, we prepare a film 30 with two attaching surfaces 31 and then attach one of the attaching surfaces 31 on the second surfaces 122 of the blocks 12, as shown in FIG. 1D. The film 30 is preferred to be flexible, such as a textile, non-woven fabric, paper and the like, yet other hard film with little flexibility is also possible to be attached to the blocks.

Figure 5:
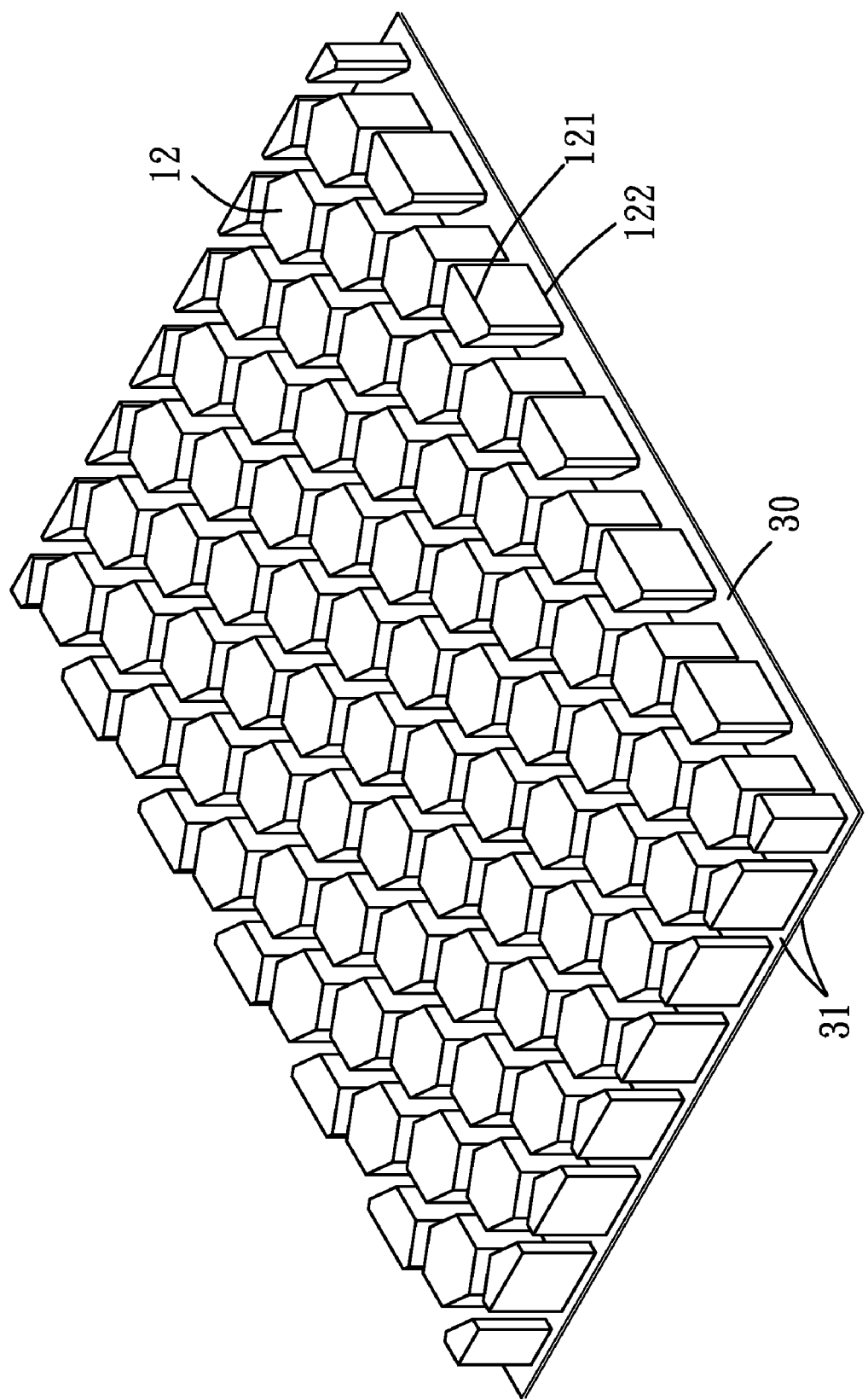
FIG. 5 is a drawing showing a film attached with blocks.

The film 30, the blocks 12 and the substrate 20 are further rolled over by the rollers 90 to smooth the film 30 and to firm the attachment between the film 30 and the blocks 12. Thereafter, we separate the blocks 12 from the sticky surface 21 of the substrate 20 in the sixth step, thereby gaining a buffer pad 1 as shown in FIG. 1E and FIG. 5.

Figure 6:
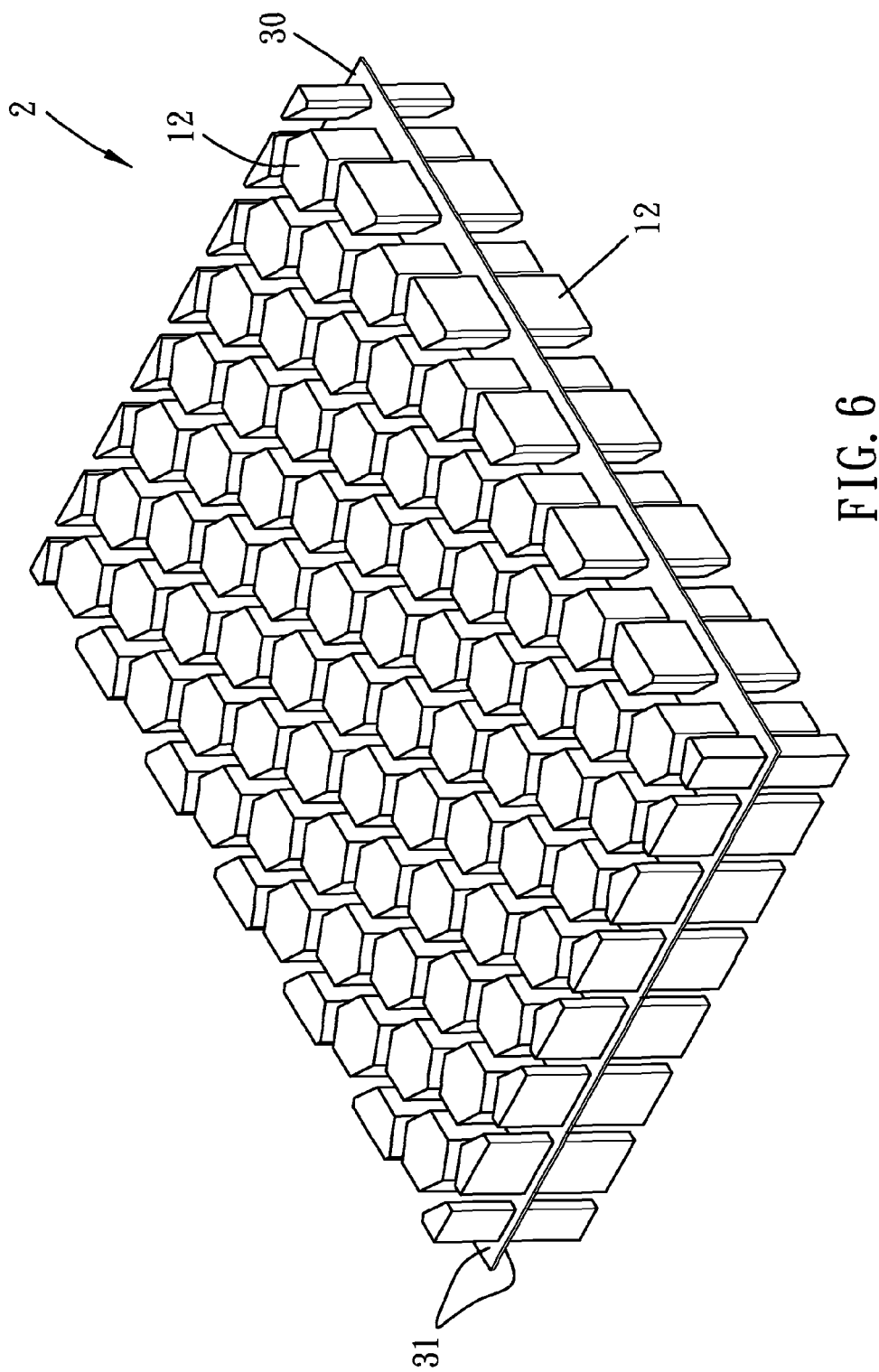
FIG. 6 is a drawing showing a film attached with two layers of blocks.

Furthermore, the buffer pad 1 can undertake the above steps to attach two layers of blocks 12 on both attaching surfaces 31 of the film 30, thereby gaining a buffer pad 2 as shown in FIG. 6.

Figure 7:
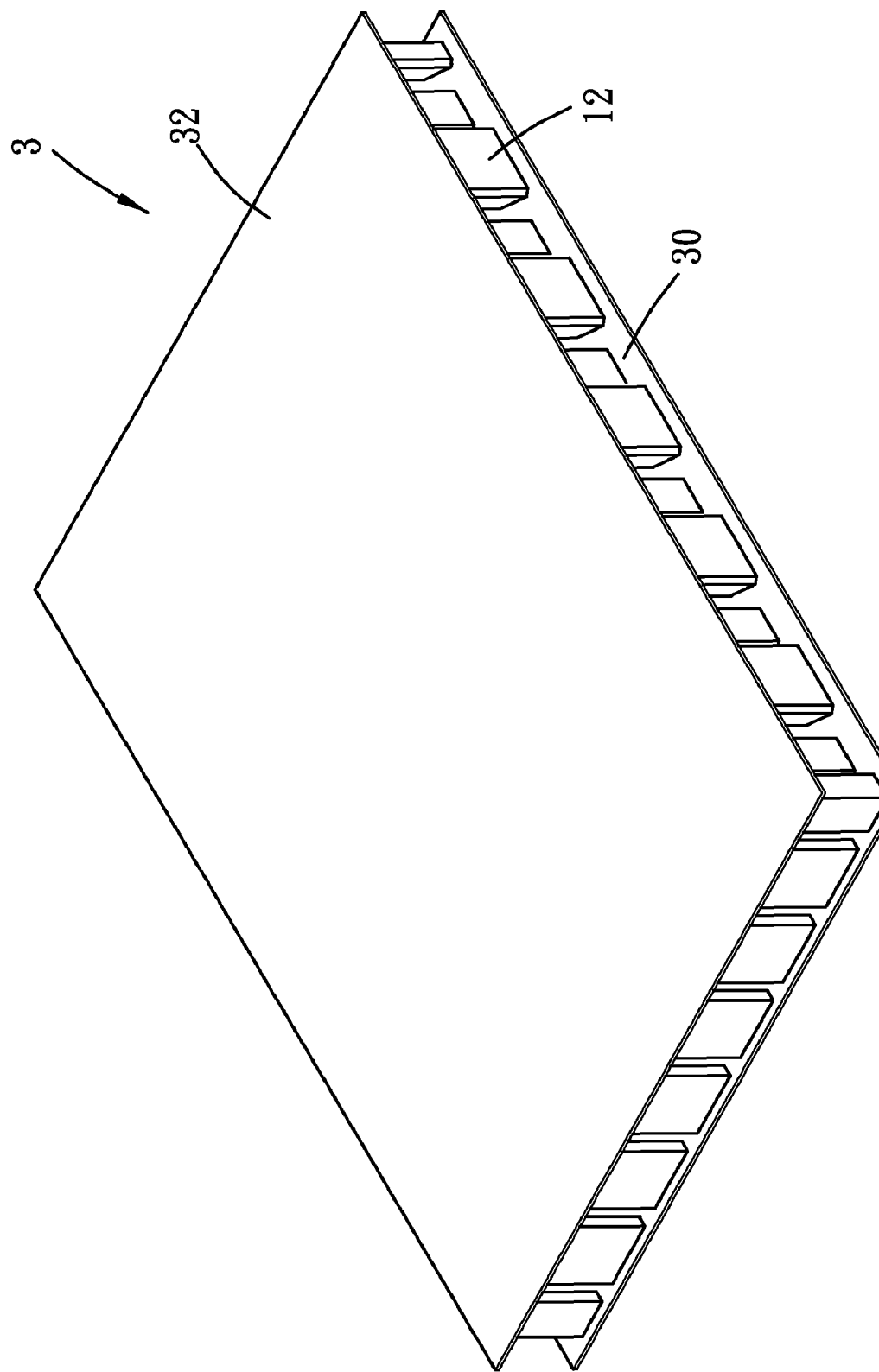
FIG. 7 is a drawing showing two films sandwiching blocks.

Or, as shown in FIG. 7, the first surfaces 121 of the blocks 12 of the buffer pad 1 can further coated with adhesive and attach to another film 32, thereby gaining a buffer pad 3 which has two films 30, 32 sandwiching the blocks 12.

In the present invention, the sticky surface is made of polyurethane based adhesive or acrylic based adhesive in order to be repeatedly used and preferably to leave substantially none residual on the blocks. The substrate 20 can be retrieved by a retriever 50, or it can be circularly disposed around a platform of the present process to be repeatedly used during the second step to the sixth step as described above. In addition, the method of the present invention can be a continuous process or a batch process.

In summary, the method for producing a buffer pad of the present invention can quickly and precisely attach multiple blocks on a film, thus significantly saving manpower and production time, i.e. the cost is greatly reduced. Also, the quality of the product is elevated, which is better than that of hand-made product. As such, by the method of the present invention, buffer pads can be manufactured quickly with high quality, in order to realize the object of mass production and meet the need of the market.

What is claimed is:

1. A method for producing a buffer pad, comprising the following steps:
   (1) preparing a flexible and resilient plate, the plate being cut to form a mesh and a plurality of blocks, the mesh having a plurality of mesh holes, the blocks having a shape corresponding to the mesh holes, and the blocks being engaged with the mesh holes respectively, each block having a first surface and a second surface opposite to the first surface;
   (2) releasably attaching the cut plate to a sticky surface of a substrate, whereby the first surfaces of the blocks are temporarily attached to the substrate;
   (3) separating the mesh from the substrate, and the blocks disengaging from the mesh holes and being left on the substrate;
   (4) coating the second surfaces of the blocks with adhesive;
   (5) preparing a film with two attaching surfaces, one of the attaching surfaces being attached to the second surfaces of the blocks;
   (6) separating the blocks from the sticky surface of the substrate;
wherein the substrate is retrieved by a retriever, the substrate is circularly disposed around a platform, whereby the substrate is repeatedly used in steps (2) to (6), and the method for producing buffer pad is a continuous process.

2. The method for producing a buffer pad of claim 1, wherein the sticky surface is made of polyurethane based adhesive or acrylic based adhesive.

3. The method for producing a buffer pad of claim 1, wherein after step (5) or (6), steps (1) to (4) are repeated again to gain a buffer pad which has two layers of blocks attaching to both attaching surfaces of the film.

4. The method for producing a buffer pad of claim 1, wherein after step (6), the first surfaces of the blocks are coated with adhesive, and an attaching surface of another film is then attached to the first surfaces of the blocks to gain a buffer pad which has two films attaching to both surfaces of the blocks.

* * * * *